United States Patent [19]

Wright

[11] Patent Number: 4,815,885

[45] Date of Patent: Mar. 28, 1989

[54] CONNECTING ARRANGEMENT

[76] Inventor: Brian L. Wright, 338, Bideford Green, Linslade, Beds, LU77TX, England

[21] Appl. No.: 26,537

[22] Filed: Mar. 16, 1987

Related U.S. Application Data

[63] Continuation-in-part of Ser. No. 664,045, Oct. 23, 1984, abandoned.

[51] Int. Cl.[4] .................................................. F16D 1/00
[52] U.S. Cl. ...................................... 403/24; 403/171; 403/176
[58] Field of Search ............... 403/171, 172, 170, 176, 403/24

[56] References Cited

U.S. PATENT DOCUMENTS 3,980,408  9/1976  Jackman ..................... 403/171 X

FOREIGN PATENT DOCUMENTS 637502  12/1978  U.S.S.R. ............................. 403/170

Primary Examiner—Andrew V. Kundrat

[57] ABSTRACT

A connecting arrangement comprises at least one connecting rod having at one or each end a connecting stud. The stud has a head portion at its free end an adjacent neck portion which leads into the head portion through an inclined shoulder. A spherical or part-spherical connecting member has one or a plurality of bores disposed on its surface and extending into the spherical or part-spherical member from its surface for receiving the connecting studs at the end of the connecting rods. One or a plurality of threaded bores each intersect a respective one of the stud receiving bores and locate a grub screw, the arrangement being such that as a said grub screw is screwed into its bore it engages said shoulder on the stud to draw said rod into said bore. Various means can be provided for preventing rotation of the connecting rods about their own axes.

4 Claims, 11 Drawing Sheets

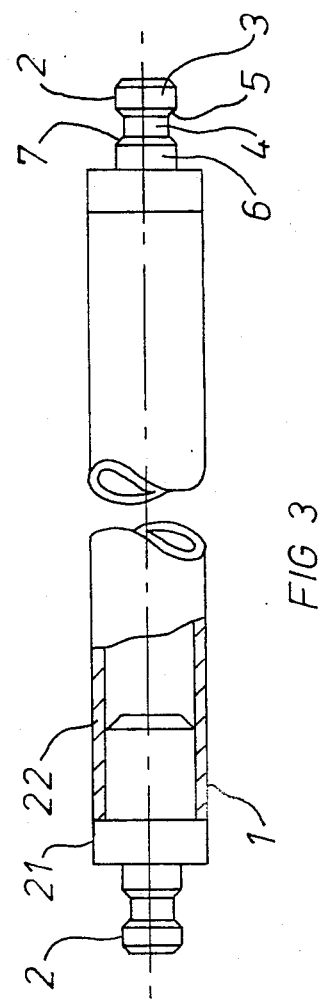
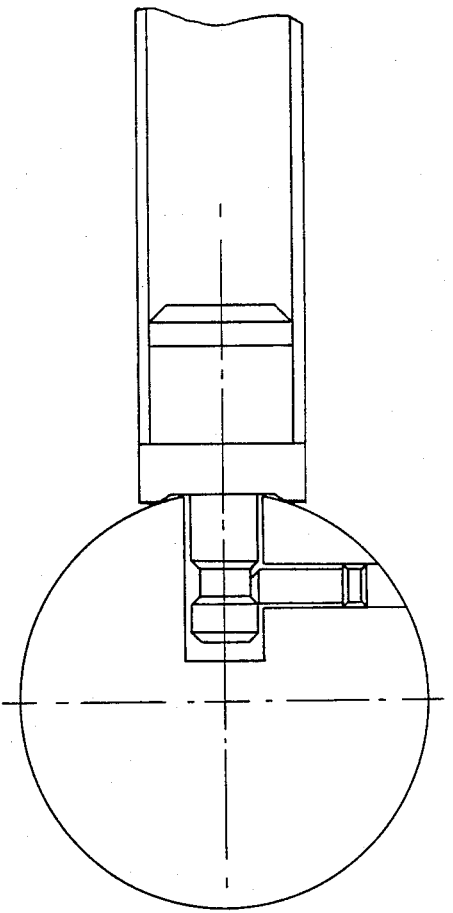

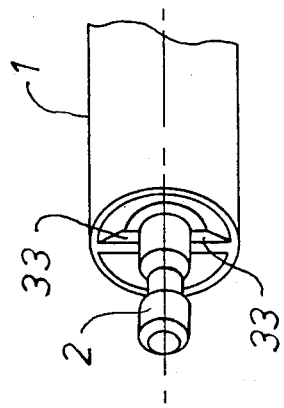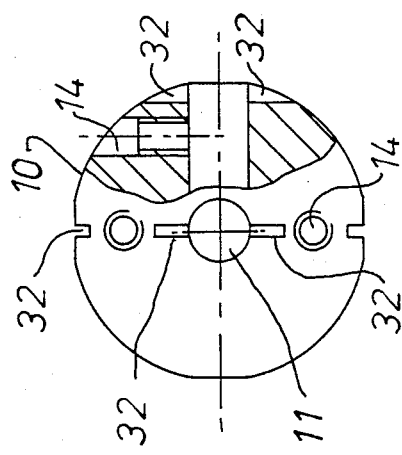
FIG 9

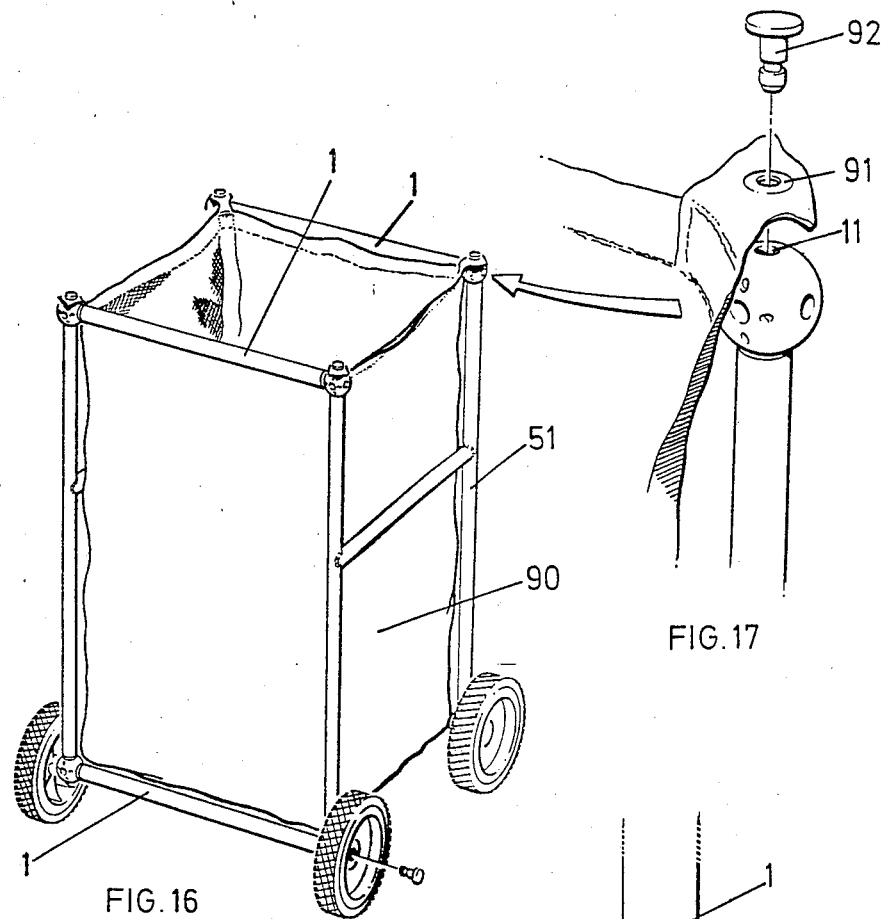
FIG.16
FIG.17
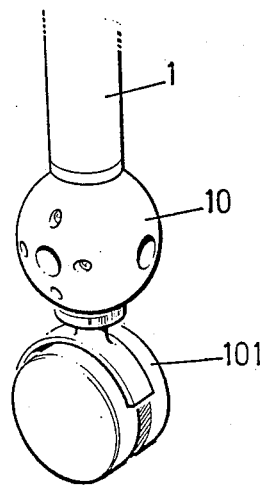
FIG.18
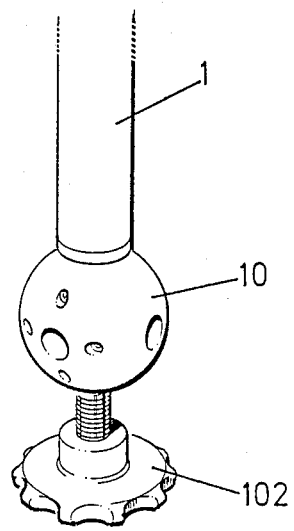
FIG.19

CONNECTING ARRANGEMENT

This application is a continuation-in-part application from my application Ser. No. 664,045 filed Oct. 23, 1984 and now abandoned.

This invention relates to connecting arrangements for inter-connecting rods or the like.

According to the invention a connecting arrangement comprises at least one connecting rod having at one or each end a connecting stud, the stud having a head portion at its free end and an adjacent neck portion which leads into the head portion through an inclined shoulder, and a spherical or part-spherical connecting member having one or a plurality of bores disposed on the surface of the connecting member and extending into the spherical member from its surface for receiving the connecting stud at the end of the connecting rod and one or a plurality of threaded bores each of which intersects a respective one of the stud receiving bores and locates a grub screw, the arrangement being such that as a said grub screw is screwed into its bore it engages said shoulder on the stud to draw said stud into said bore.

Various connecting arrangements in accordance with the invention will now be described by way of example with reference to the accompanying drawings, in which FIG. 1 is a plan view of a connecting member of a first arrangement, FIG. 2 is a section through the connecting member FIG. 3 is a view partly in section of a connecting rod of the first arrangement, and FIG. 4 is a view of the connecting member and connecting rod assembled together to form the connecting arrangement.

FIG. 9 is a view of a sixth connecting arrangement,

Figure 10:
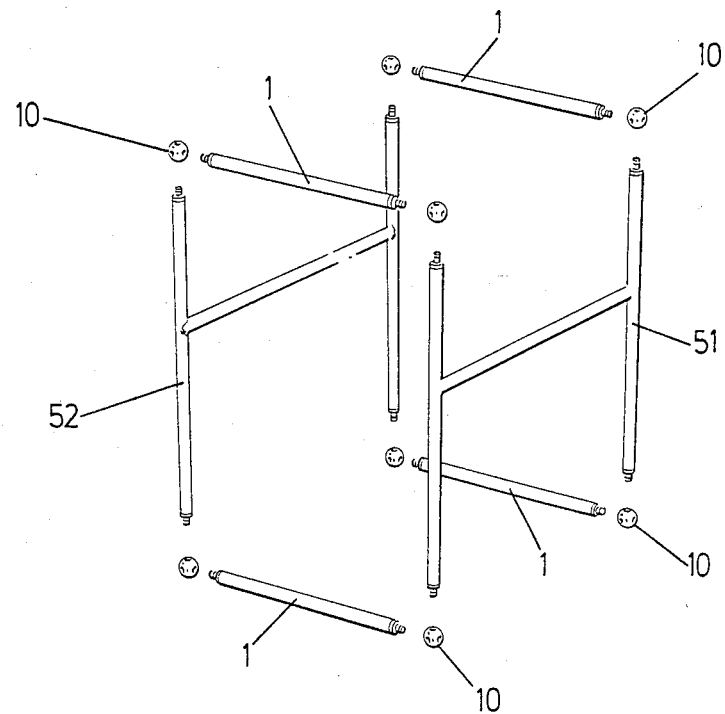
FIG. 10 shows an exploded view of a three-dimensional frame assembly made up using a number of the connecting arrangements of FIGS. 3 and 4.
Figure 11:
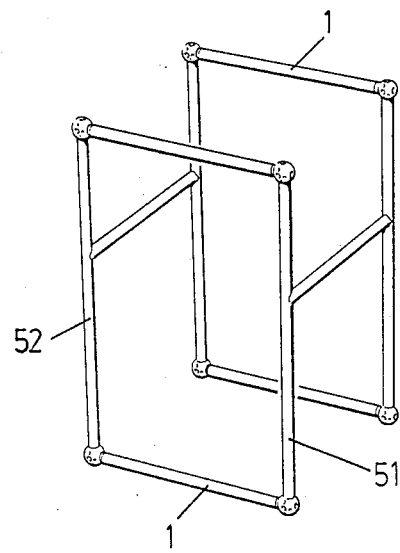
FIG. 11 shows the assembled frame.
Figure 15:
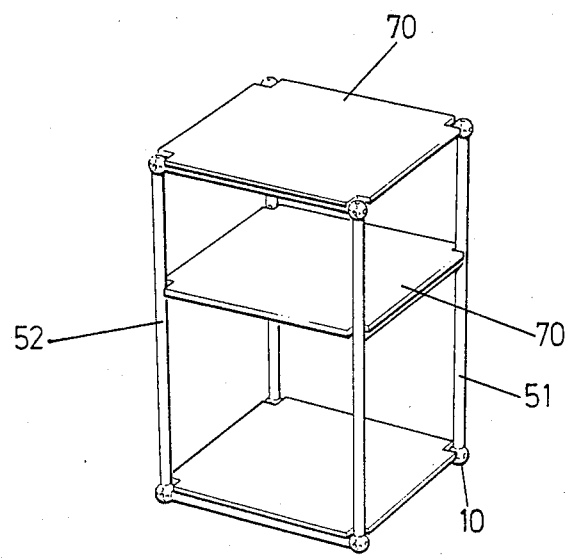
Figure 14:
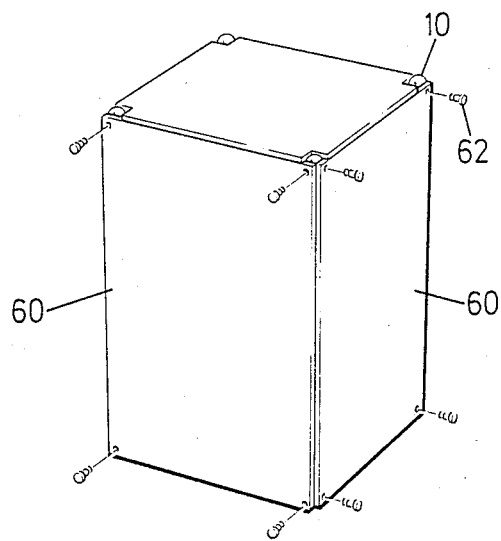

FIG. 14 shows cladding applied to the frame assembly of FIGS. 10 and 11 to form an enclosure FIG. 15 shows the use of the frame assembly of FIGS. 10 and 11 in a shelf unit, FIGS. 16 and 17 shows the frame assembly used in a trolley, and FIGS. 18 and 19 show respectively how the connecting arrangement of FIGS. 3 and 4 can be used to mount a castor wheel and an adjustable foot.

In the various connecting arrangements to be described, the same reference numerals have been used to designate corresponding parts.

Referring now to FIGS. 1 to 4 of the drawings, connecting rod 1 has connecting studs 2 projecting axially from each end. The studs 2 are formed as parts of plugs 21 which plug into the ends of a tube 22 to form the connecting rod 1. Each of these studs 2 comprise a head portion 3 at its free end, an adjacent neck portion 4 which leads into the head portion 3 through sloping shoulder 5 and a body portion 6 which connects with the neck portion 3 through sloping shoulder 7.

The connecting member 10 is a complete sphere and has four blind bores 11 which extend from the surface towards the centre of the sphere on the equator, so to speak, of the sphere, the axes of the bores 11 being at right-angles to each other and two further bores 12 which extend from the North and South poles. The bores 12 could be replaced by a single through bore. The connecting member 10 also has a plurality of threaded bores 14 each of which intersects a respective one of the bores 11 and 12 and locates a grub screw 15.

Thus when the stud 2 of a connecting rod is pushed into one of the bores 11 and 12 it can be locked in position by the grub screw located in the intersecting bore 14. The dimensioning is such that the inner end of grub screw 15 engages the shoulder 5, so that the further the grub screw is screwed into the engagement the more it rides down the shoulder 5 and the more the stud 2 is pulled into the bore until it, the rod 1, is solidly locked against the surface of the connecting member 10.

The rods 1 and their studs 2 as well as the connecting members 10 can be made from plastics material or metal as desired.

Figure 5:
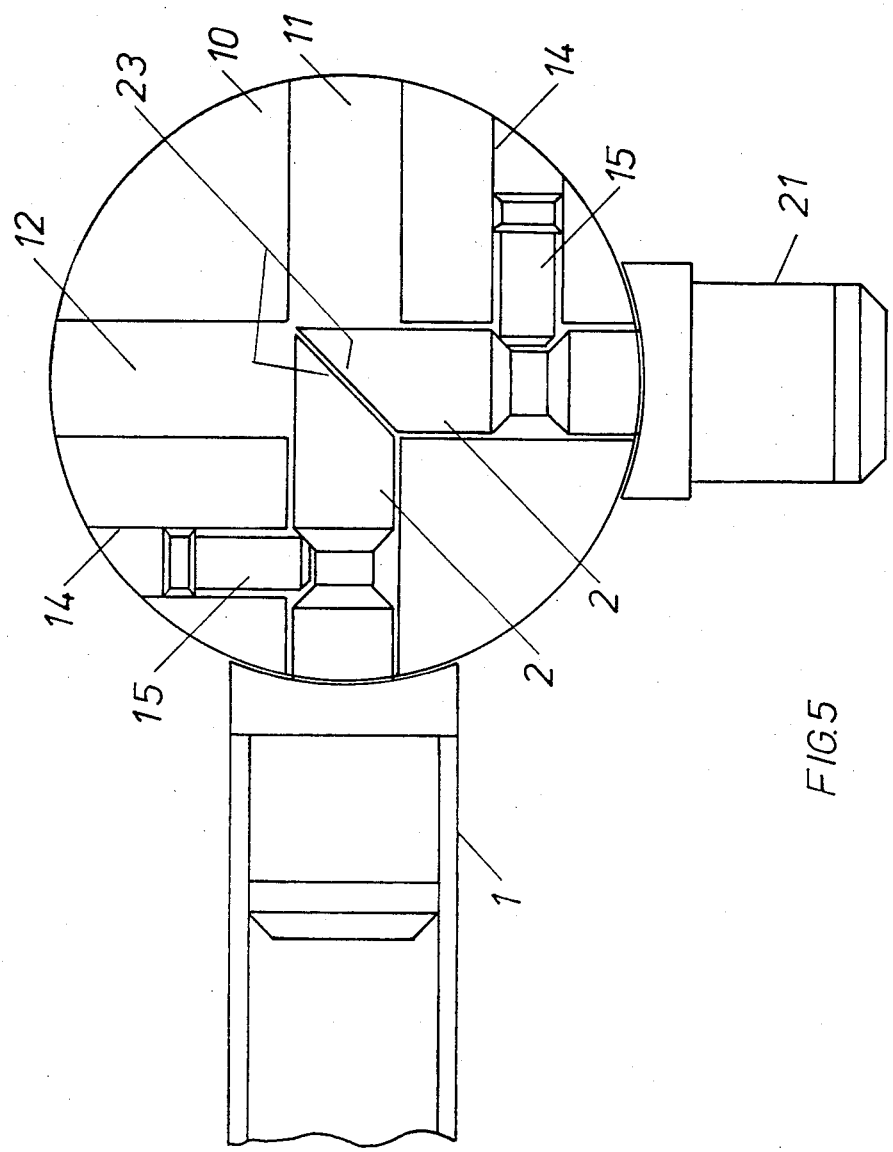
FIG. 5 is a view of a second connecting arrangement.

Referring now to FIG. 5, a connecting arrangement is shown which is similar in principle to that previously described. However in this arrangement the stud receiving bores 11 and 12 meet each other at the centre of the spherical connecting member 10 so that in effect several diametrical through bores are provided.

The studs 2 of FIG. 5 are longer than the studs 2 of FIG. 3 and also the end face 23 of each stud 2 is chamfered so that it is at 45° to the axis of the stud 2. Thus when two rods 1 are fitted into bores 11 and 12 which extend at right-angles to each other the studs 2 abut each other in a mitred joint ensuring a fixed relative disposition of the two rods. Also the rods are prevented from rotating about their own axes by the abutment of their end faces.

Figure 6:
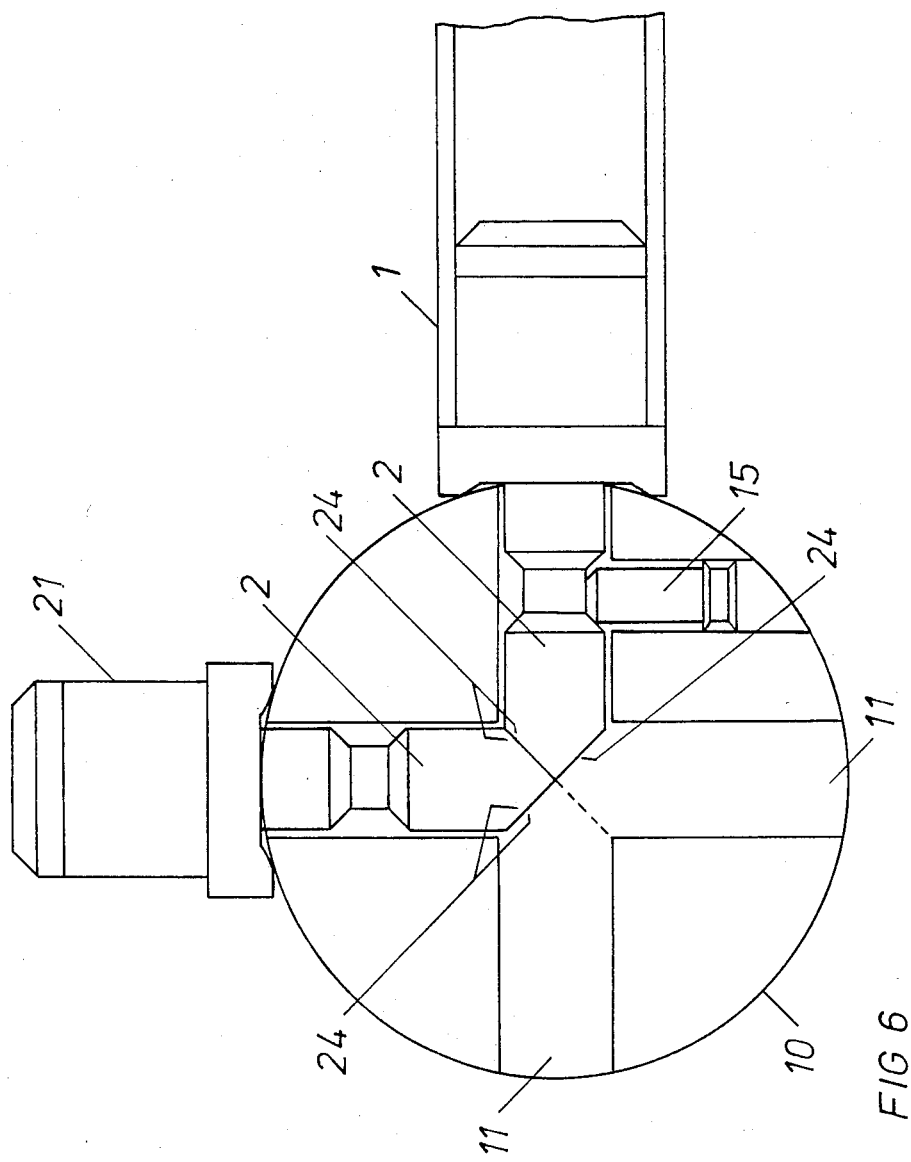
FIG. 6 is a view of a third connecting arrangement.

Referring to FIG. 6, the connecting member 10 has bores 11 and 12 which meet each other at the centre of the connecting member as in FIG. 5 to provide in effect several diametrical through bores. This arrangement differs from the arrangement of FIG. 5 in that the ends of the studs 2 are pointed by providing the end of each stud 2 with two chamfered faces 24 which extend at 45° to the axis of the stud. Thus when four rods 1 are fitted into respective bores 11 the ends of the studs interfit to ensure a fixed relative disposition of the four rods 1 and to prevent them rotating about their own axes.

Figure 7:
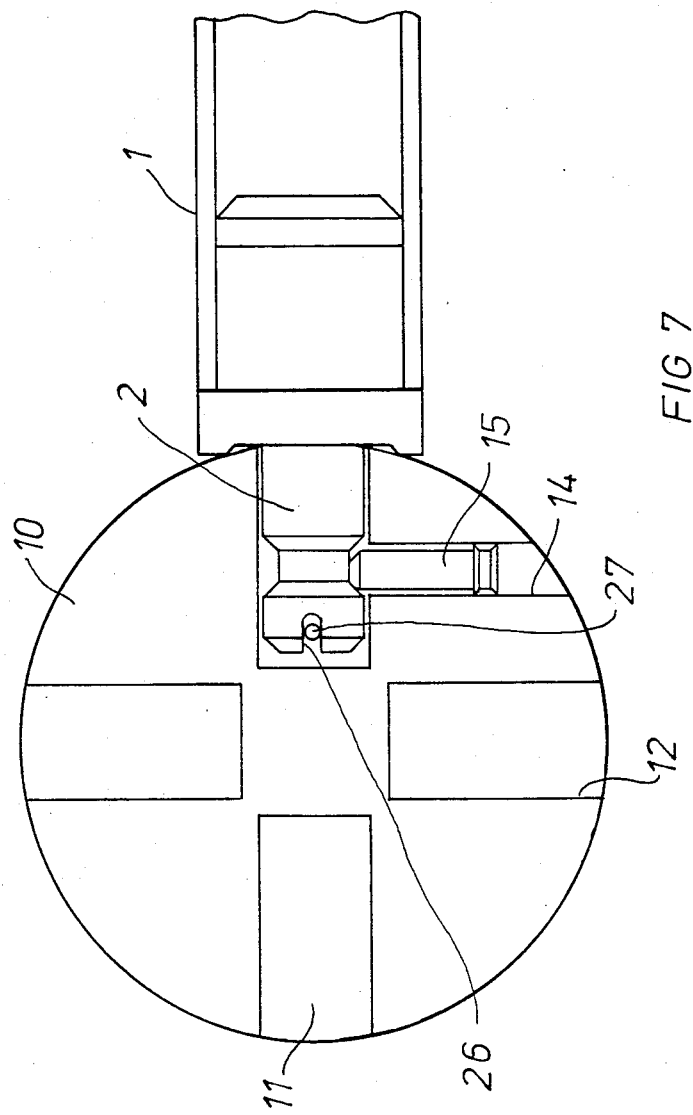
FIG. 7 is a view of a fourth connecting arrangement.

FIG. 7 shows a connecting arrangement similar to that shown in FIGS. 1 to 4 in that it has a connecting member 10 with blind bores 11 and 12 into which the studs 2 at the ends of connecting rods 1 can be fitted. The connecting arrangement differs from that shown in FIGS. 1 to 4 in that the ends of the studs 2 are provided with transverse grooves 26 and a pin 27 extends across each of the bores 11 and 12. Thus when the stud 2 on a rod 1 is pushed into a bore 11 or 12 in the appropriate orientation the pin 27 engages in the slot 26 so that rotation of the rod 1 about its own axis relative to the connecting member 10 is prevented.

Figure 8:
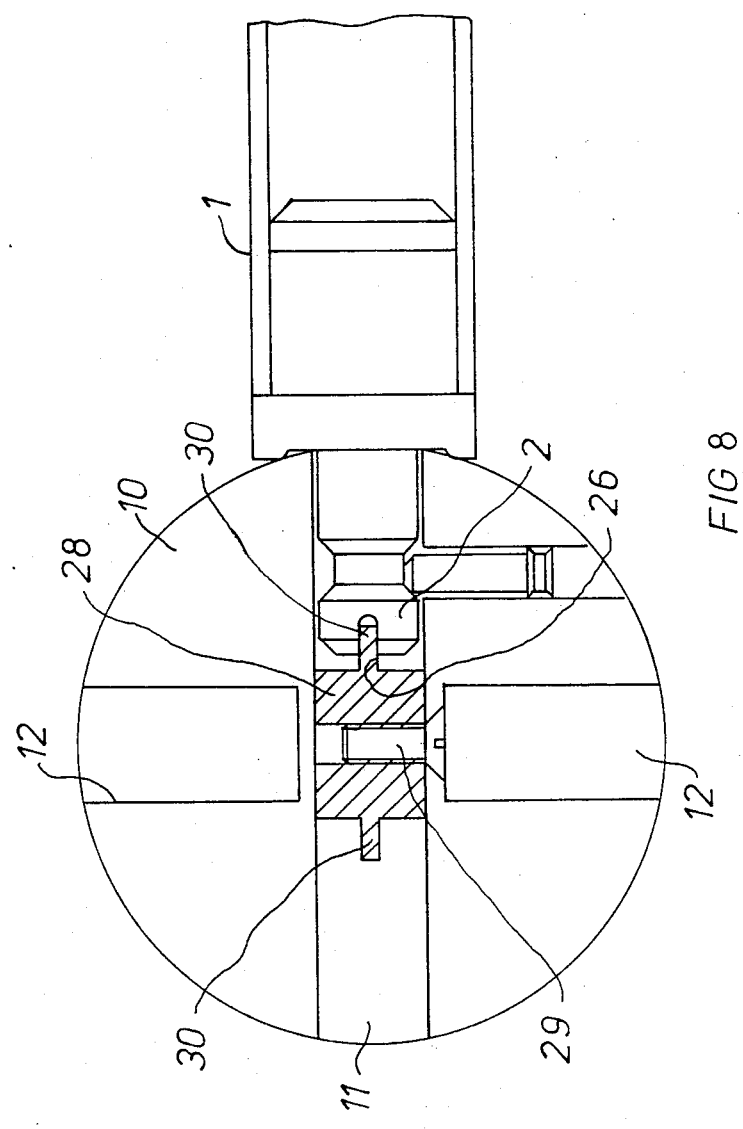
FIG. 8 is a view of a fifth connecting arrangement.

FIG. 8 shows a connecting arrangement which is similar in principle to that of FIG. 7 in that the ends of the studs 2 are provided with transverse grooves 26. However in the arrangement of FIG. 8 the bores 11 are through bores and a block 28 is located at the centre of the connecting member 10 and is fixed in position by a screw 29 whose head is accessible through the bottom of one of the blind bores 12. The block has tongues 30 for locating in the grooves 26 at the ends of the studs 2.

FIG. 9 shows a further connecting arrangement in which a rod 1 is prevented from rotating about its own axis relative to a connecting member.

In this arrangement slots 32 extend from both sides of the bores 11 at the surface of the connecting member 10 and webs 33 are provided on the ends of the rods 1 for engagement in the slots 32 when the studs 2 are pushed into the bores 11.

As will be appreciated a whole range of two and three dimensional frames can be built up from a set of the connecting members and rods. Also special fittings can be provided, these fittings having a stud similar to that shown on the rod 1. Such fittings can be designed for various purposes, such as clamps which clamp a table top or a length of shelving at its supporting points, canopy fixings, lamp holders and multitude of other purposes.

FIGS. 10 to 13 show one frame assembly using a series of connecting arrangements as shown in FIGS. 1 to 4.

The frame assembly comprises two opposing H frames 51 and 52 connected together by a series of connecting rods 1 extending between the two H frames 50 and 51 and locating in connecting members 10 at the upper and lower ends of vertical links 52 and 53 of each H frame.

From an inspection of FIGS. 1 to 4 it can be seen that the neck portion 4 is circular in cross-section. If the grub screws 15 are loosened off so that they do not bind too tightly with the neck portion 4 of the studs 2, then the connecting member 10 can be rotated on the end of the rod with the grub screw rotating around the neck portion 4 of the stud 2 and acting as a bearing on it. This permits the frame assembly to be folded substantially flat as shown in FIGS. 12 and 13.

Figure 12:
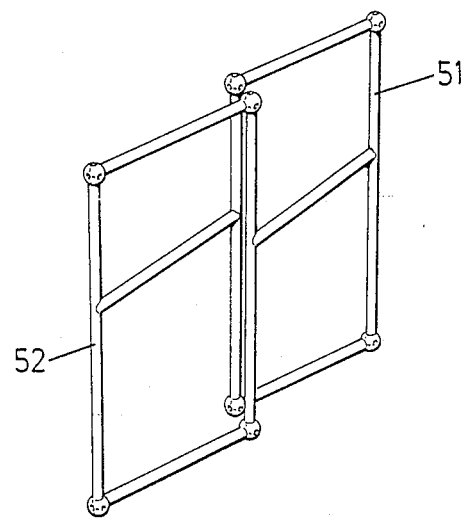
FIGS. 12 and 13 show the collapsibility of the frame assembly
Figure 13:
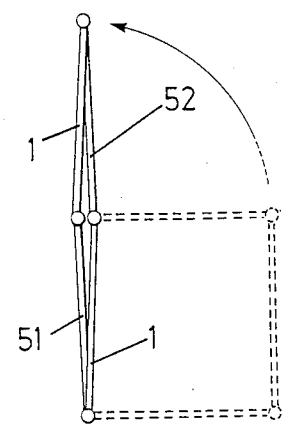

Conveniently the frame assembly of FIGS. 11 to 13 can be covered with cladding sheets 60 as shown in FIG. 14. The cladding sheets being secured in place by screws 62 which screw into the threaded bores of the connecting members 10.

Alternatively the frame assembly of FIGS. 11 to 13 can be used as a shelf unit, with shelves 70 supported on the horizontal frame members of the assembly as shown in FIG. 15.

In FIGS. 16 and 17 is shown how the frame assembly can be formed into a trolley fitted with a bag container 90. The bag 90 is suspended within the frame assembly from the four upper connecting members 10. To achieve this the four corners of the bag 90 are provided with eyelets 91 through which pass studs 92 into the bores 11 or 12 of the connecting members 10. The studs 92 are similar in contour to the studs 2 and can therefore be secured in position by grub screws 15 screwed into the threaded bores 14 in the members 10. The wheels 94 of the trolley are held in position by similar studs 92 locating in bores 11 or 12 of the members 10.

Figure 1:
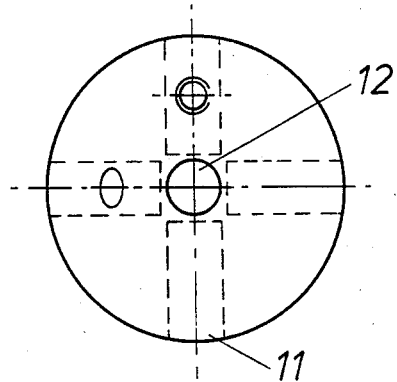
Figure 2:
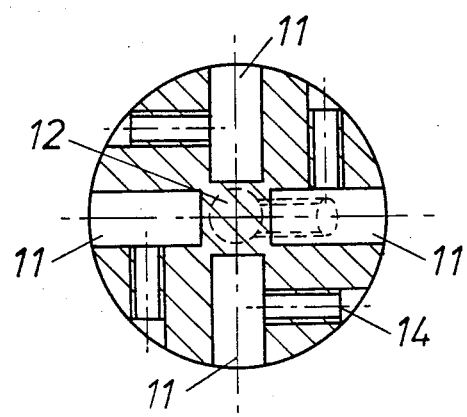

In FIGS. 18 and 19 respectively are shown how a castor wheel 101 and an adjustable foot 102 can be secured to the lower end of a vertical limb 103 of a frame assembly such as that shown in FIGS. 11 to 14. In both cases a stud similar to that FIG. 2 is formed integrally with the castor wheel 101 or the adjustable foot 102 and locates in a bore in the connecting member 10 at the lower end of the vertical limb 103.

I claim:

1. A connecting arrangement comprising at least one connecting rod having at one end a connecting stud which is fixed to said end of the rod and has a free end which projects therefrom, and a part spherical shoulder intermediate its end and facing said free end, the said free end having a head portion, an adjacent neck portion and a sloping shoulder between the head and neck portions and a connecting member having an, at least part spherical outer surface, and a plurality of stud receiving bores disposed on said outer surface and extending into said member from said outer surface for receiving the connecting stud at the end of said connecting rod, a plurality of threaded bores in said part spherical connecting member each of which intersects a respective one of the stud receiving bores and a grub screw locating in each of said threaded bores, the arrangement being such that as a said grub screw is screwed into its bore it engages said shoulder on the stud, to draw said stud into the bore in which it is received, whereby said part spherical shoulder is drawn into abutment with the outer surface of the connecting member enabling varying degrees of engagement between the outer surface of the connecting member and said part spherical shoulder.

2. A connecting arrangement comprising at least two connecting rods having at one end a connecting stud which is fixed to said end of the rod and has a free end which projects therefrom, and a part spherical shoulder intermediate its end and facing said free end, the said free end having a head portion, an adjacent neck portion and a sloping shoulder between the head and neck portions and a connecting member having an, at least part spherical outer surface, and a plurality of stud receiving bores disposed on said outer surface and extending into said member from said outer surface for receiving the connecting stud at the end of said connecting rods, at least two of said stud receiving bores intersecting each other and the end faces at the free ends of the studs of connecting rods fitted into said two bores abutting each other, said end faces extending obliquely to the axes of the studs, a plurality of threaded bores in said part spherical connecting member each of which intersects a respective one of the stud receiving bores and a grub screw locating in each of said threaded bores, the arrangement being such that as a said grub screw is screwed into its bore it engages said shoulder on the stud to draw said stud into the bore in which it is received, whereby said part spherical shoulder is drawn into abutment with the outer surface of the connecting member enabling varying degrees of engagement between the outer surface of the connecting member and said part spherical shoulder.

3. A frame assembly utilising a number of connecting arrangements, each of said connecting arrangements comprising at least one connecting rod having at one end a connecting stud which is fixed or integral to said end of the rod and has a free end which projects therefrom, and a part spherical shoulder intermediate its end and facing said free end, the said free end having a head portion, an adjacent neck portion and a sloping shoulder between the head and neck portions and a connecting member having an, at least part spherical outer surface, and a plurality of stud receiving bores disposed on said outer surface and extending into said member from said outer surface for receiving the connecting stud at the end of said connecting rod, a plurality of threaded bores in said part spherical connecting member each of which intersects a respective one of the stud receiving bores and a grub screw locating in each of said threaded bores, the arrangement being such that as a said grub screw is screwed into its bore it engages said shoulder on the stud, to draw said stud into the bore in which it is received, whereby said part spherical shoulder is drawn into abutment with the outer surface of the connecting member enabling varying degrees of engagement between the outer surface of the connecting member and said part spherical shoulder, and the frame assembly comprising connecting rods in the form of two opposing H frames and connecting rods interconnecting the H frames at the free ends of the H.

4. A frame assembly according to claim 3, wherein with the grub screws of the connecting members loosened off said connecting members can rotate about the limbs of the H frame so that the frame assembly can be varied in geometry and collapsed into substantially planar form

* * * * *